United States Patent
Kadowaki (10) Patent No.: US 12,299,241 B2
(45) Date of Patent: May 13, 2025

(54) WIRE MESH SENSOR AND SHAPE EVALUATING METHOD

(71) Applicant: Wacom Co., Ltd., Saitama (JP)

(72) Inventor: Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/351,391

(22) Filed: Jul. 12, 2023

(65) Prior Publication Data
US 2023/0359310 A1    Nov. 9, 2023

Related U.S. Application Data

(63) Continuation of application No. PCT/JP2021/002722, filed on Jan. 27, 2021.

(51) Int. Cl.
G06F 3/044    (2006.01)

(52) U.S. Cl.
CPC .................... *G06F 3/044* (2013.01)

(58) Field of Classification Search
CPC ....................................................... G06F 3/044
See application file for complete search history.

(56) References Cited

U.S. PATENT DOCUMENTS

| | | | | |
|---|---|---|---|---|
| 2014/0111711 A1* | 4/2014 | Iwami | ..................... | B32B 15/02 349/12 |
| 2014/0152580 A1* | 6/2014 | Weaver | .................. | G06F 3/0412 345/173 |
| 2017/0221195 A1* | 8/2017 | Iwami | ..................... | G06F 3/044 |
| 2018/0081464 A1* | 3/2018 | Sunada | .................... | G06F 3/044 |
| 2024/0273674 A1* | 8/2024 | Miyagi | ................. | G06T 7/0002 |

FOREIGN PATENT DOCUMENTS

| | | | | |
|---|---|---|---|---|
| JP | 2012103761 A | | 5/2012 | |
| JP | 2017227983 A | * | 12/2017 | ............. G06F 3/044 |
| JP | 2018026055 A | | 2/2018 | |

OTHER PUBLICATIONS

International Search Report, mailed Mar. 16, 2021, for International Patent Application No. PCT/JP2021/002722. (2 pages).

* cited by examiner

*Primary Examiner* — Kwang-Su Yang (74) *Attorney, Agent, or Firm* — Seed IP Law Group LLP (57) ABSTRACT

Provided is a wire mesh sensor including one or more wire meshes provided in a planar shape. Each of the one or more wire meshes includes a plurality of effective elements forming a band-shaped electrode extending in one direction by a combination of a plurality of line elements or a plurality of point elements, and a plurality of dummy elements isolated from the effective elements. At least the effective elements have a pattern shape that is asymmetric with respect to a first center line along the direction in which the band-shaped electrode extends, as viewed in a plan view. A line symmetry degree of the pattern shape with respect to the first center line is greater than or equal to 0.8.

5 Claims, 10 Drawing Sheets

WIRE MESH SENSOR AND SHAPE EVALUATING METHOD

BACKGROUND

Technical Field

The present disclosure relates to a wire mesh sensor and a shape evaluating method.

Description of the Related Art

Recently, wire mesh sensors having planar wire meshes have been spreading in a technical field of capacitance type touch sensors. In a case where a sensor of this kind is used in combination with a display device, it is assumed that, as a contrivance for suppressing a moire caused by a pattern shape of wire meshes and thereby enhancing the visibility of a display screen, irregularity is imparted to the pattern shape.

For example, Japanese Patent Laid-open No. 2018-026055 and Japanese Patent Laid-open No. 2017-227983 (hereinafter, referred to as Patent Document 1 and Patent Document 2, respectively) disclose a wire mesh sensor in which a square lattice or a rhombic lattice is formed as viewed in plan, by a first conductive layer and a second conductive layer being arranged in a superimposed manner. In addition, according to FIG. 4 and FIG. 8 of Patent Document 1, a band-shaped electrode extending in one direction (an X-direction or a Y-direction) is formed by a combination of a plurality of line elements.

In the sensors disclosed in Patent Documents 1 and 2, the pattern shape of the band-shaped electrode is not line-symmetric with respect to a center line thereof, and wiring density thereof in a width direction is locally nonuniform. However, when a touch by a finger of a human is detected, the size of a touch area is sufficiently large as compared with the width of the band-shaped electrode, and therefore, the local nonuniformity of the wiring density is mitigated. As a result, even the above-described pattern shape hardly affects accuracy of detection of an indicated position.

On the other hand, a position is more accurately indicated easily by use of a position indicator (for example, an electronic pen or a conductor stick) having a sharp distal end portion, in place of a finger of a human. However, in a case where the size of the distal end portion is smaller than the width of the band-shaped electrode, the effect of nonuniformity of the wiring density cannot be ignored, and the shape of a detected signal distribution may change depending on a slight difference in the indicated position. As a result, a result of detection of a peak position of the signal distribution varies, and the accuracy of detection of the indicated position is thus decreased.

BRIEF SUMMARY

The present disclosure has been made in view of such problems. Embodiments of the present disclosure provide a wire mesh sensor and a shape evaluating method that can suppress a decrease in accuracy of detection of a position indicated by a position indicator having a sharp distal end portion, while maintaining the visibility of the pattern shape.

A wire mesh sensor according to a first aspect of the present disclosure includes one or more wire meshes provided in a planar shape. Each of the one or more wire meshes includes a plurality of effective elements forming a band-shaped electrode extending in one direction by a combination of a plurality of line elements or a plurality of point elements, and a plurality of dummy elements isolated from the effective elements. At least the effective elements have a pattern shape that is asymmetric with respect to a first center line along the direction in which the band-shaped electrode extends, as viewed in a plan view. A line symmetry degree of the pattern shape with respect to the first center line is greater than or equal to 0.8.

A shape evaluating method according to a second aspect of the present disclosure is applied to a wire mesh sensor including one or more wire meshes provided in a planar shape. The shape evaluating method is performed by one or more computers and includes obtaining image data representing a pattern shape possessed by the wire mesh sensor, setting a center line of the pattern shape identified by the image data, and evaluating whether a line symmetry degree of the pattern shape with respect to the center line is within a predetermined range.

According to the first aspect of the present disclosure, it is possible to suppress a decrease in accuracy of detection of a position indicated by a position indicator having a sharp distal end portion, while maintaining the visibility of the pattern shape. According to the second aspect of the present disclosure, it is possible to identify a wire mesh sensor that can suppress a decrease in accuracy of detection of a position indicated by a position indicator having a sharp distal end portion, while maintaining the visibility of the pattern shape.

DETAILED DESCRIPTION OF THE PREFERRED EMBODIMENT

An embodiment of the present disclosure will hereinafter be described with reference to the accompanying drawings. In each drawing, identical constituent elements and acts are identified by the same reference symbols where possible, in order to facilitate understanding of the description, and repeated description thereof may be omitted.

DESCRIPTION OF EVALUATION SYSTEM 10

General Configuration

Figure 1:
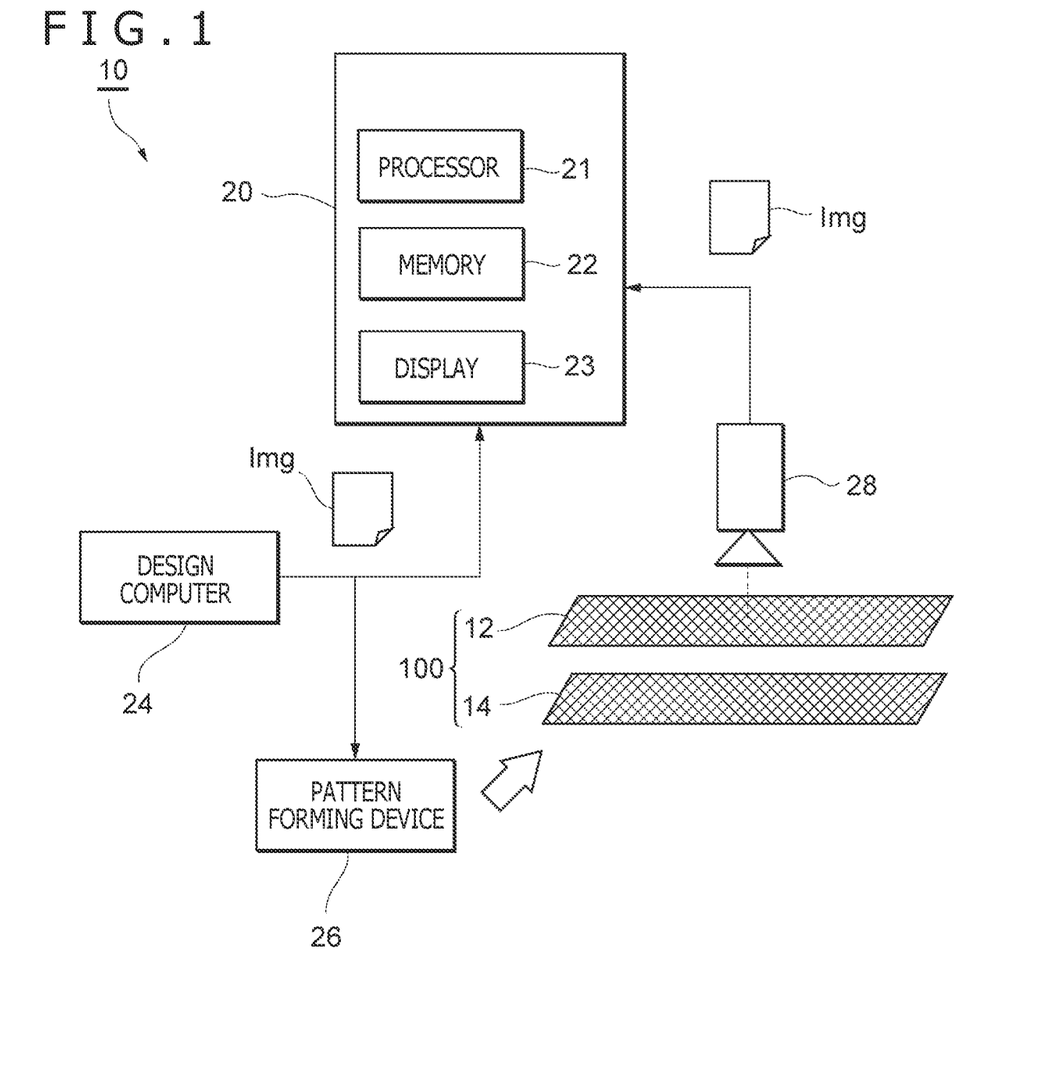
FIG. 1 is a general configuration diagram of an evaluation system that performs a shape evaluating method in one embodiment of the present disclosure.

FIG. 1 is a general configuration diagram of an evaluation system 10 that performs a shape evaluating method in one embodiment of the present disclosure. The evaluation system 10 is configured to be able to evaluate a pattern shape possessed by an evaluation target object. Here, the evaluation target object is, for example, a wire mesh sensor 100 that detects a position indicated by a user.

The wire mesh sensor 100 is a planar sensor in which a mesh pattern formed of metallic thin wires (wires) is provided on a principal surface of a substrate. An insulative material such as polyethylene terephthalate (PET) is used as the substrate. A material having high conductivity such as copper (Cu), silver (Ag), or gold (Au) is used as metal. Depicted in the present diagrammatic example are a conductive sheet 12 for detecting a position in an X-direction in a touch surface (X-Y plane) in a two-dimensional shape and a conductive sheet 14 for detecting a position in a Y-direction in the touch surface.

The evaluation system 10 specifically includes an evaluation computer 20, a design computer 24, a pattern forming device 26, and a camera 28.

The evaluation computer 20 is a device that quantitatively evaluates a pattern shape possessed by wire meshes of the conductive sheets 12 and 14, and outputs an evaluation result obtained. The evaluation computer 20 includes a processor 21, a memory 22, and a display 23.

The design computer 24 is a device that generates image data Img representing the pattern shape of the wire meshes. The image data Img after being generated is supplied to the pattern forming device 26 or the evaluation computer 20.

The pattern forming device 26 is a device that fabricates the conductive sheets 12 and 14 by forming a mesh pattern on one or both of principal surfaces possessed by the substrate. Methods for forming the mesh pattern include, for example, an ink jet method, a nanoimprint lithography method, a silver salt method, and the like.

The camera 28 obtains the image data Img representing the pattern shape of the wire meshes, by imaging the principal surfaces of the conductive sheets 12 and 14. The image data Img after being obtained is supplied to the evaluation computer 20.

Figure 3:
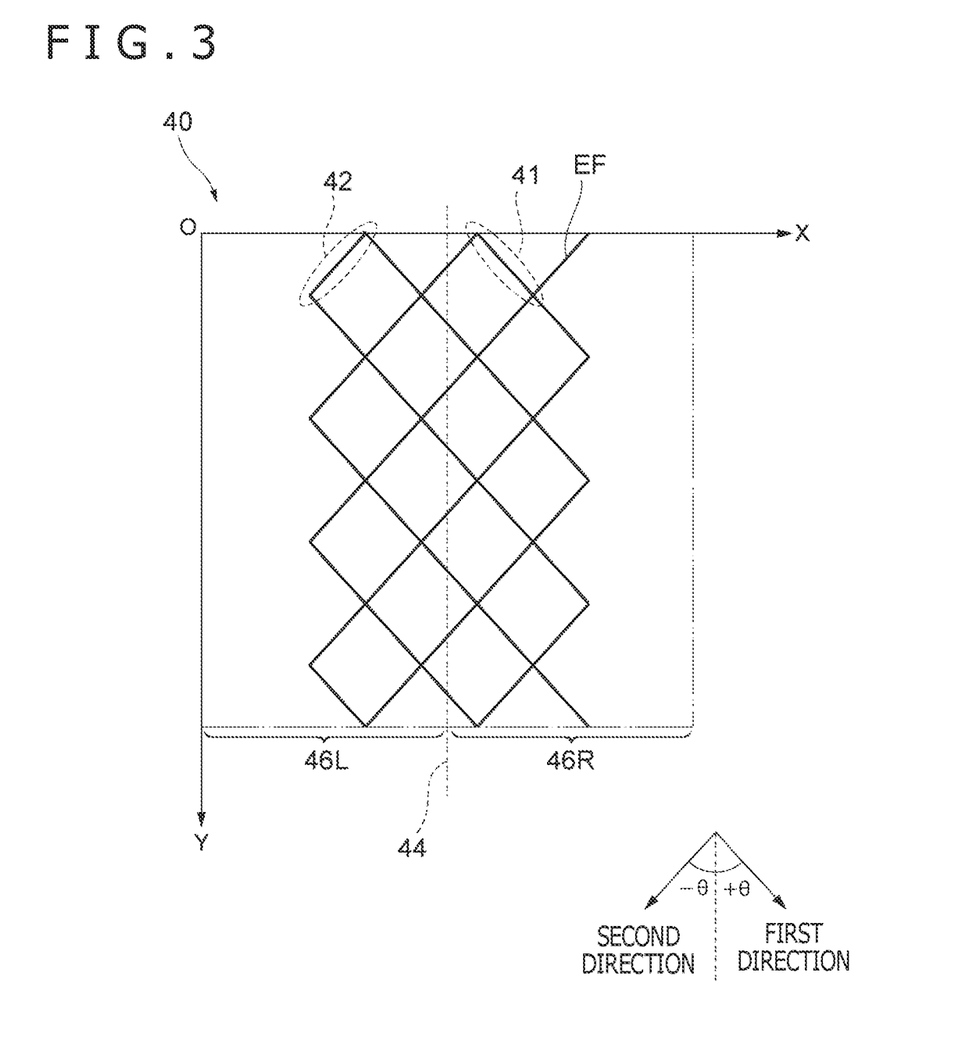
FIG. 3 is a diagram visibly depicting a binary image resulting from preprocessing at SP12 in FIG. 2.

Incidentally, when the user indicates a position by using an active pen 104 (FIG. 10), the shape of a detected signal distribution may change depending on a slight difference in pen tip position. As a result, a result of detection of a peak position of the signal distribution varies, and accuracy of detection of the indicated position is thus decreased. Accordingly, there is a desire for designing or identifying the wire mesh sensor 100 that can suppress a decrease in the accuracy of detection of a position indicated by a position indicator having a sharp distal end portion, while maintaining the visibility of a pattern shape 40 (FIG. 3).

Operation of Evaluation Computer 20

The evaluation system 10 in the present embodiment is configured as described above. Next, operation of the evaluation computer 20 depicted in FIG. 1 will be described in detail with reference to a flowchart of FIG. 2, FIG. 3, and FIG. 4.

Figure 2:
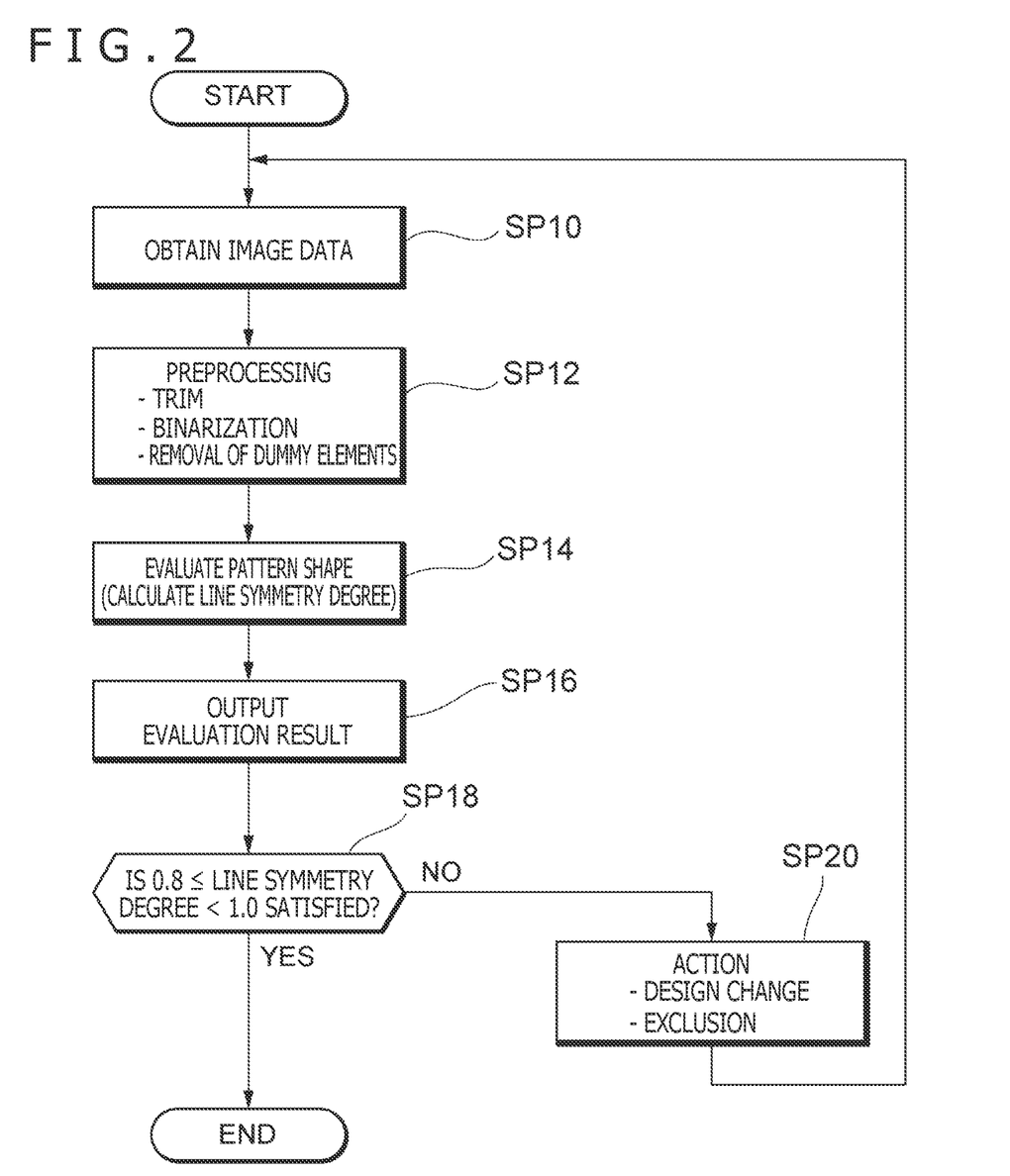
FIG. 2 is a flowchart of operation of an evaluation computer depicted in FIG. 1.

At SP10 in FIG. 2, the evaluation computer 20 obtains the image data Img representing the pattern shape of the conductive sheets 12 and 14. This pattern shape may be a design pattern used for the fabrication of the conductive sheets 12 and 14, or may be an actually measured pattern obtained by imaging the actual conductive sheets 12 and 14.

At SP12, the evaluation computer 20 subjects the image data Img obtained at SP10 to preprocessing as required. Cited as an example of the preprocessing is [1] trim processing, [2] binarization processing, [3] processing of removing dummy elements DM, or the like.

The trim processing is image processing that cuts out a necessary partial region from an image region represented by the image data Img. For example, in a case of a pattern shape having regularity, a basic pattern representing a repetition unit is extracted. In addition, in a case of a pattern shape not having regularity, a sample pattern including one band-shaped electrode is extracted.

The binarization processing is image processing that reduces the number of gradations of the image data Img from three or more to two. Consequently, for example, a position at which a thin metallic wire is present is expressed by a "pixel value=0," and a position at which no thin metallic wire is present is expressed by a "pixel value=1." A threshold value for the binarization can be set to be various values.

The removing processing is image processing that classifies the pattern shape represented by the image data Img into "effective elements EF" and "dummy elements DM" in pixel units, and removes only the dummy elements DM. Here, the effective elements EF are an aggregate of pattern elements forming a band-shaped electrode extending in one direction, by a combination of a plurality of line elements or point elements. On the other hand, the dummy elements DM are a plurality of line elements or point elements isolated from the effective elements EF. That is, the effective elements EF can also be said to be pattern elements contributing to a change in capacitance which change accompanies the approaching of a conductor. On the other hand, the dummy elements DM can also be said to be pattern elements not contributing to the change in capacitance which change accompanies the approaching of the conductor.

FIG. 3 is a diagram visibly depicting a binary image resulting from the preprocessing at SP12 in FIG. 2. FIG. 3 depicts the pattern shape 40 of a band-shaped electrode constituting a part of the conductive sheet 12 (FIG. 1). The pattern shape 40 is formed by a combination of first line segments 41 extending in a first direction (+θ direction) and second line segments 42 extending in a second direction (−θ direction). As is understood from FIG. 3, in the pattern shape 40, a plurality of rhombuses are regularly arranged without a gap, so that the pattern shape 40 partially has line symmetry, but does not have line symmetry as a whole.

At SP14 in FIG. 2, the evaluation computer 20 performs evaluation processing on the binary image obtained by the preprocessing at SP12. This evaluation processing calculates an index indicating the level of line symmetry in the X-direction of the pattern shape 40 (which index will hereinafter be referred to as a "line symmetry degree"). This line symmetry degree is a matching rate of pixel values obtained in a case where a left side pattern 46L is folded back to a right side pattern 46R (conversely, in a case where the right side pattern 46R is folded back to the left side pattern 46L) with respect to a first center line 44 (FIG. 3) extending in the Y-direction orthogonal to the X-direction.

The above-described matching rate is calculated by (the number of pixels at which pixel values coincide with each other)/(a total number of pixels constituting the image). According to this definition, the line symmetry degree assumes any one of values within a range of [0, 1]. In a case of perfect line symmetry, the line symmetry degree is 1. On the other hand, as the line symmetry is decreased, the value of the line symmetry degree becomes smaller. Here, in consideration of calculation errors or the like, the pattern shape 40 is defined as being "symmetric" when the line symmetry degree is equal to or more than 0.98, and the pattern shape 40 is defined as being "not symmetric (asymmetric)" when the line symmetry degree is less than 0.98.

Figure 4:
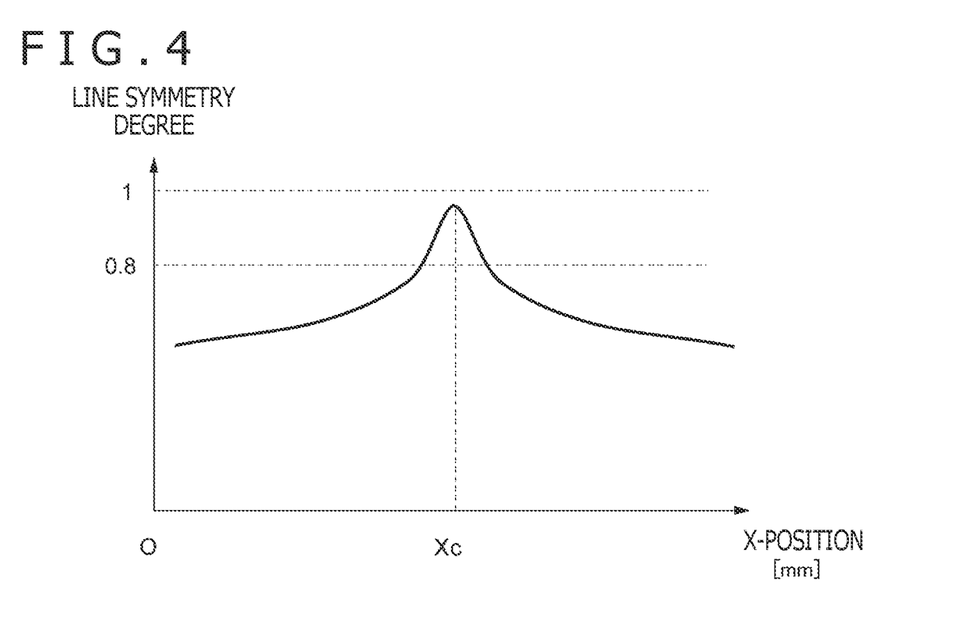
FIG. 4 is a diagram depicting an example of a relation between a position of a folding line and a line symmetry degree.

FIG. 4 is a diagram depicting an example of relation between the position of a folding line and the line symmetry degree. An axis of abscissas in the graph indicates the X-position (unit: mm) of the folding line, and an axis of ordinates in the graph indicates the line symmetry degree (unit: dimensionless) of the pattern shape 40. As is understood from this graph, the line symmetry degree assumes a maximum value when the X-position of the folding line coincides with the first center line 44 (X=Xc). On the other hand, as the folding line goes away from the first center line 44, the line symmetry degree is gradually decreased. The position of the first center line 44 suitable for the pattern shape 40 can be identified by use of this characteristic. That is, the line symmetry degree of the pattern shape 40 is obtained by generating the graph depicted in FIG. 4 while gradually changing the position of the folding line.

Then, the evaluation computer 20 determines whether or not the calculated line symmetry degree is within an allowable range. This allowable range is specifically set to be greater than or equal to 0.8 and less than 1.0. It is to be noted that a lower limit value of the range is not limited to 0.8, and may be set to be a value larger than 0.8 (for example, 0.85 or the like) or a value smaller than 0.8 (for example, 0.75). In addition, an upper limit value of the range is not limited to 1.0, and may be set to be a value smaller than 1.0 (for example, 0.95, 0.90, or the like).

At SP16 in FIG. 2, the evaluation computer 20 outputs an evaluation result obtained at SP14. For example, the evaluation computer 20 displays the pattern shape 40, the line symmetry degree, a pass or a fail in the determination, and the like within a display region of the display 23.

At SP18, a worker checks, based on the contents output at SP16, whether or not the line symmetry degree of the pattern shape 40 is within the allowable range, specifically, whether or not the line symmetry degree of the pattern shape 40 is greater than or equal to 0.8 and less than 1.0. When the line symmetry degree is within the allowable range (SP18: YES), the execution of the flowchart of FIG. 2 is ended. When the line symmetry degree is outside the allowable range (SP18: NO), on the other hand, the processing proceeds to SP20.

At SP20, the worker performs necessary action for the evaluation target object whose line symmetry degree is determined to be outside the allowable range at SP18. This action includes [1] a change in design of the pattern shape 40, [2] the exclusion of the conductive sheets 12 and 14 as a defective product, and the like.

Thereafter, a return is made to SP10 to repeat SP10 to SP20 in order. The evaluation computer 20 thus evaluates the shape of the wire mesh sensor 100 (that is, evaluates visibility and detectability).

Effects of Shape Evaluating Method

As described above, the shape evaluating method is applied to the wire mesh sensor 100 having one or a plurality of wire meshes provided in a planar shape. According to this method, one or more computers (for example, the evaluation computer 20) perform (SP10 in FIG. 2) obtaining the image data Img representing the pattern shape 40 possessed by the wire mesh sensor 100 and (SP14 in FIG. 2) setting the first center line 44 of the pattern shape 40 identified by the image data Img and evaluating whether or not the line symmetry degree of the pattern shape 40 with respect to the first center line 44 is within a predetermined range.

Because of such a configuration, it is possible to identify the wire mesh sensor 100 that can suppress a decrease in accuracy of detection of an indicated position, even in a case where a position indicator having a sharp distal end portion is used.

Each wire mesh includes effective elements EF forming a band-shaped electrode extending in one direction by a combination of a plurality of line elements or point elements and dummy elements DM as a plurality of line elements or point elements isolated from the effective elements EF. As viewed in plan, at least the effective elements EF have a pattern shape asymmetric with respect to the first center line 44 along the direction in which the band-shaped electrode extends. The line symmetry degree of the pattern shape 40 with respect to the first center line 44 is greater than or equal to 0.8.

Because of such a configuration, it is possible to suppress a decrease in accuracy of detection of a position (here, an X-position) indicated by the active pen 104 (FIG. 10) having a sharp distal end portion, while maintaining the visibility of the pattern shape 40.

In addition, a pattern shape 40 including effective elements EF but not including dummy elements DM may be set as an evaluation object. This makes it possible to perform a quantitative evaluation in which weight is placed on detection accuracy.

OTHER EXAMPLES OF SHAPE EVALUATING METHOD

Other examples (first to third examples) of the shape evaluating method for the wire mesh sensor 100 will next be described with reference to FIGS. 5 to 9.

First Example

Figure 5:
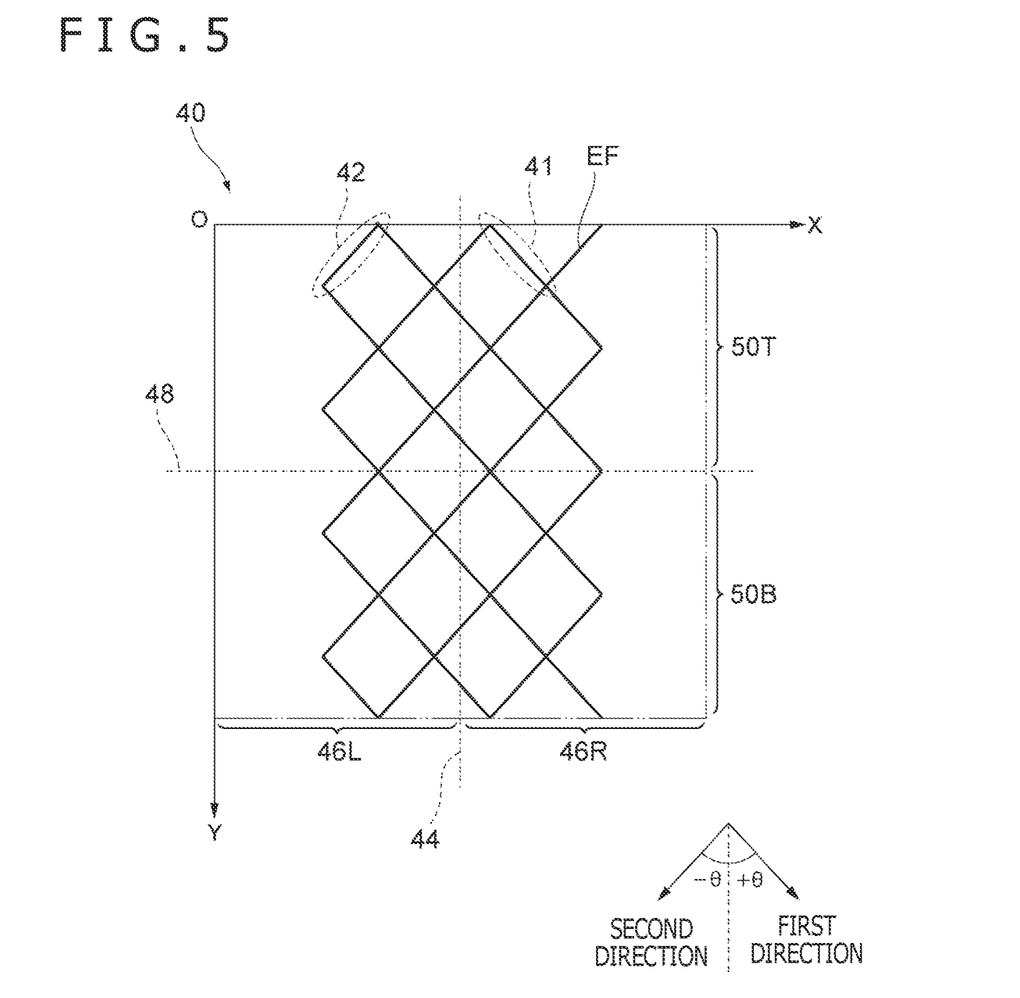
FIG. 5 is a diagram depicting a first example of a shape evaluating method according to an embodiment of the present disclosure.

FIG. 5 is a diagram depicting a first example of the shape evaluating method. The present diagram depicts the same pattern shape 40 as that in FIG. 3. Here, the evaluation computer 20 evaluates not only line symmetry in the X-direction but also line symmetry in the Y-direction. In this case, a first line symmetry degree is a matching rate of pixel values obtained in a case where the left side pattern 46L is folded back to the right side pattern 46R with respect to the first center line 44 extending in the Y-direction. On the other hand, a second line symmetry degree is a matching rate of pixel values obtained in a case where an upper side pattern 50T is folded back to a lower side pattern 50B (conversely, in a case where the lower side pattern 50B is folded back to the upper side pattern 50T) with respect to a second center line 48 extending in the X-direction.

Thus, the evaluation computer 20 at SP14 in FIG. 2 may set the second center line 48 orthogonal to the first center line 44, and further evaluate whether or not the line symmetry degree of the pattern shape 40 with respect to the second center line 48 is within the predetermined range.

Then, in a case where at least the effective elements EF have a pattern shape 40 asymmetric with respect to the second center line 48 as viewed in plan, the line symmetry degree of the pattern shape 40 with respect to the second center line 48 may be greater than or equal to 0.8. Because of such a configuration, it is possible to suppress a decrease in accuracy of detection of a position (here, an X-position) indicated by the active pen 104 (FIG. 10), while maintaining the visibility of the pattern shape 40.

Second Example

Figure 6:
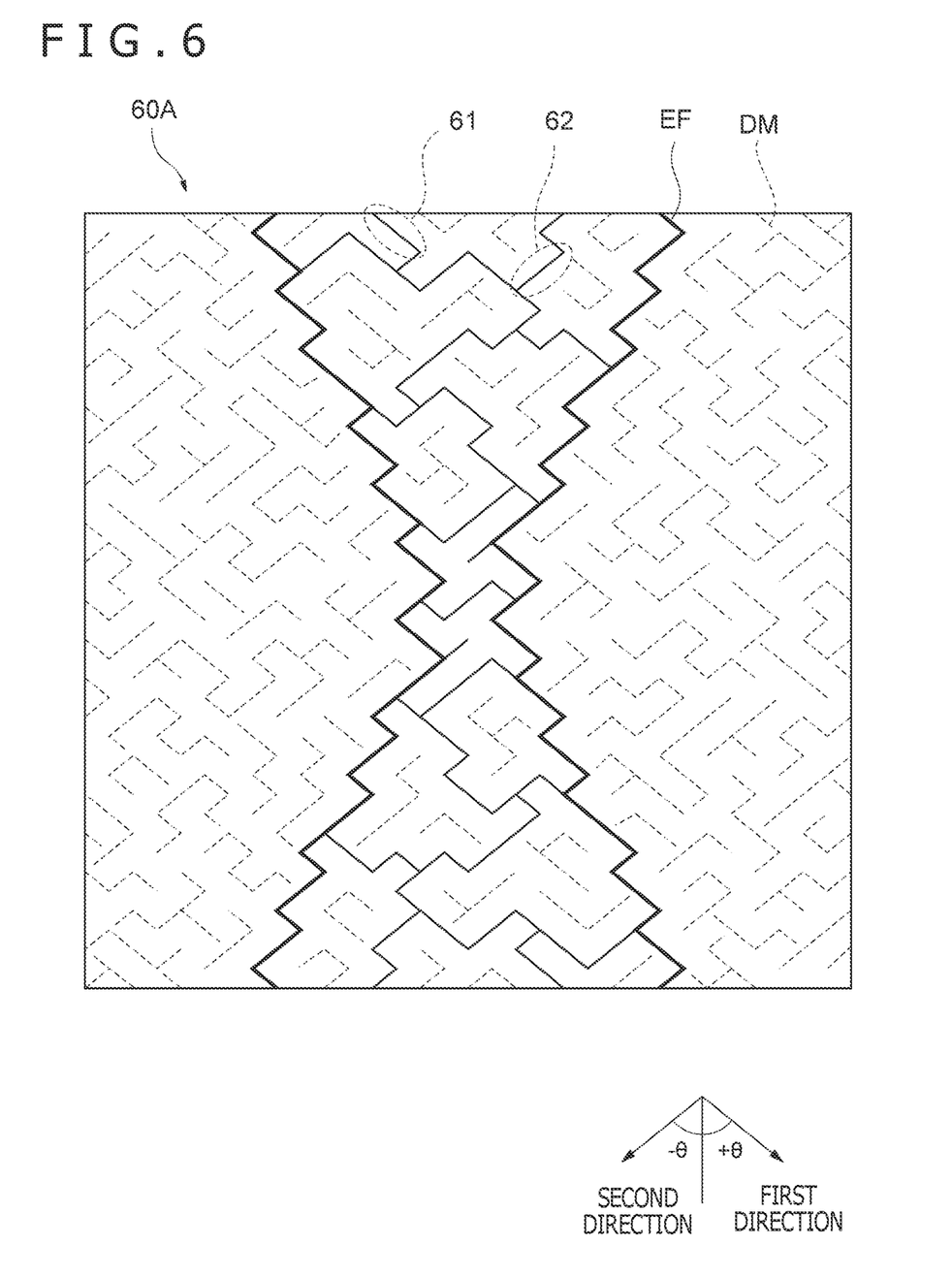
FIG. 6 is a diagram depicting a pattern shape in a second example of a shape evaluating method embodiment of the present disclosure.

FIG. 6 is a diagram depicting a pattern shape 60A in a second example of the shape evaluating method. The pattern shape 60A provided in FIG. 8 in Patent Document 1 is depicted as an example of an evaluation object. The pattern shape 60A is formed by a combination of a plurality of first line segments 61 extending in the first direction (+θ direction) and a plurality of second line segments 62 extending in the second direction (−θ direction). As is understood from this diagram, the pattern shape 60A is formed by the effective elements EF and the dummy elements DM being mixed with each other. Here, the pattern shape 60A including both the effective elements EF and the dummy elements DM may be set as the evaluation object. This makes it possible to perform a quantitative evaluation in which not only the accuracy of detection of an indicated position but also the visibility of the pattern shape 60A is taken into consideration.

Figure 7:
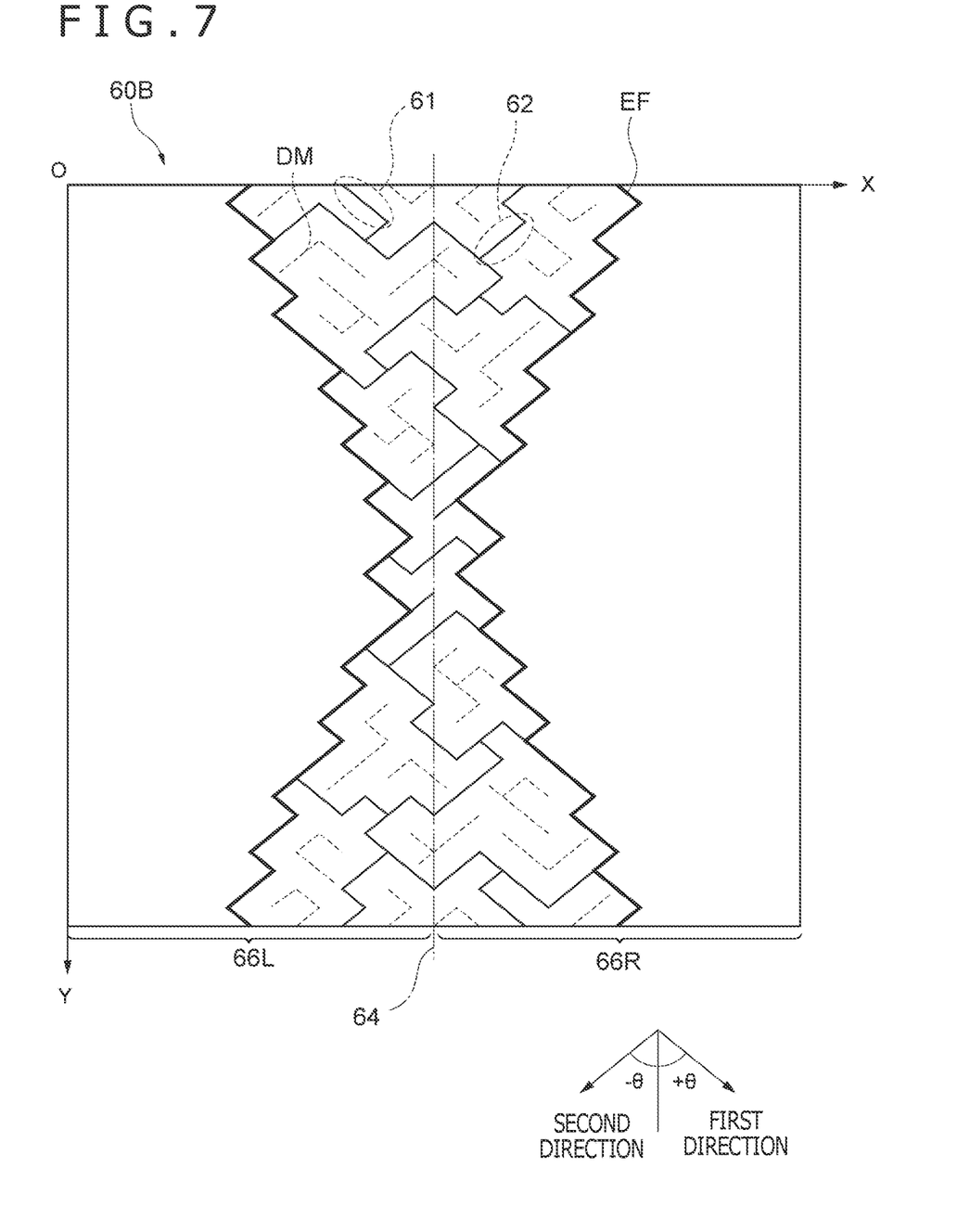
FIG. 7 is a diagram depicting the second example of the shape evaluating method according to an embodiment of the present disclosure.

FIG. 7 is a diagram depicting the second example of the shape evaluating method. This diagram depicts a pattern shape 60B obtained after a part of the dummy elements DM are removed from the pattern shape 60A of FIG. 6. Specifically, only dummy elements DM present within a region in an hourglass shape formed by the effective elements EF are left in the pattern shape 60B. Here, the pattern shape 60B including both the effective elements EF and the dummy elements DM may be set as the evaluation object. This makes it possible to perform a quantitative evaluation in which visibility is also taken into consideration within the region formed by the effective elements EF.

Third Example

Figure 8:
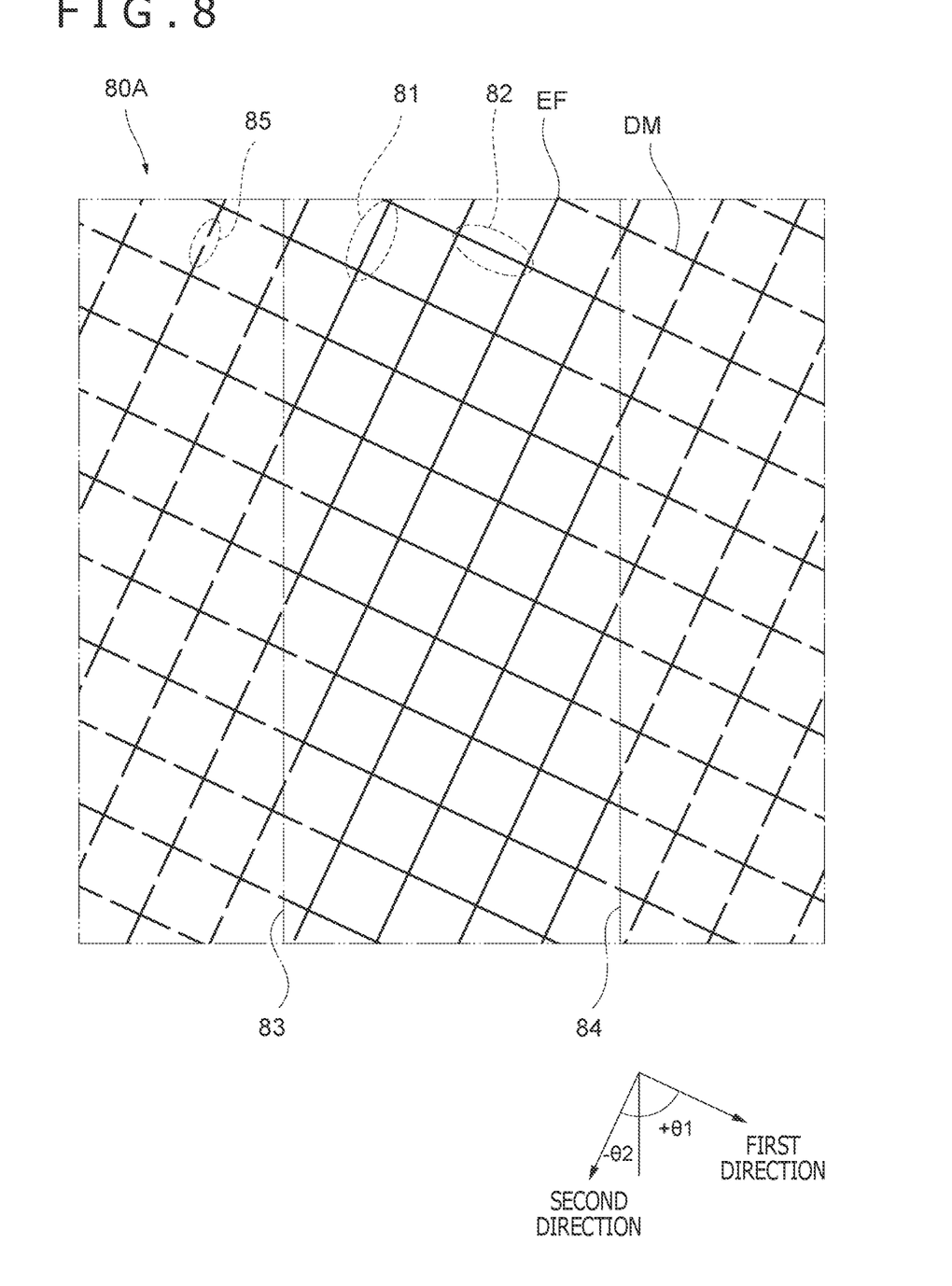
FIG. 8 is a diagram depicting a pattern shape in a third example of a shape evaluating method according to an embodiment of the present disclosure.

FIG. 8 is a diagram depicting a pattern shape 80A in a third example of the shape evaluating method. The pattern shape 80A provided in Patent Document 2 is depicted as an example of the evaluation object. The pattern shape 80A is formed by a combination of a plurality of first line segments 81 extending in the first direction (+θ1 direction) and a plurality of second line segments 82 extending in the second direction (−θ2 direction). Here, when θ1≠θ2 and a relation θ1+θ2=90 degrees is satisfied, a square lattice is formed by first line segments 81 and second line segments 82.

In addition, outside two boundary lines 83 and 84, a gap 85 that divides each side of the square lattice into two equal parts is provided at a plurality of positions. Due to the gaps 85, a plurality of dummy elements DM having a cross shape are formed outside the effective elements EF.

Figure 9:
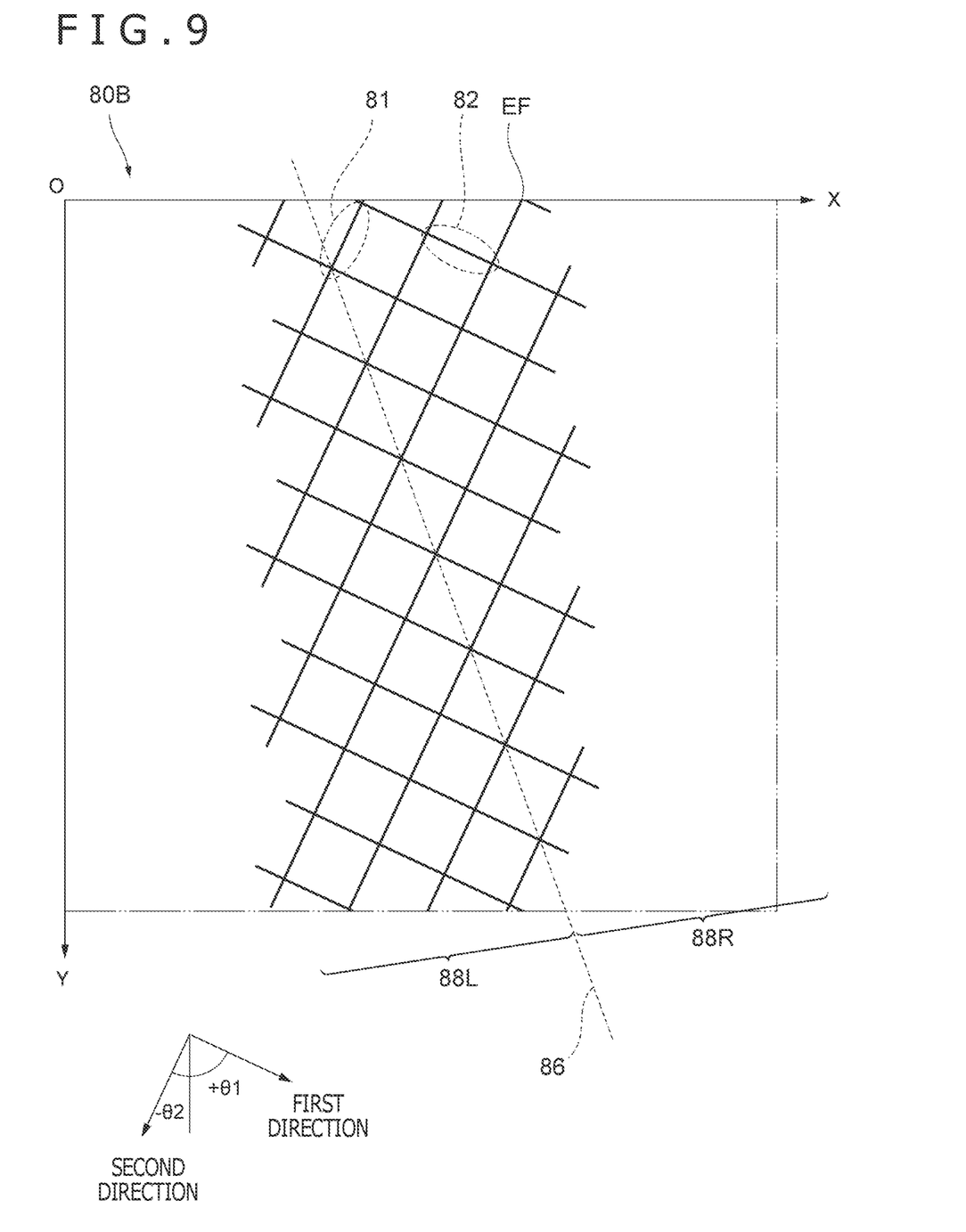
FIG. 9 is a diagram depicting the third example of the shape evaluating method according to an embodiment of the present disclosure.

FIG. 9 is a diagram depicting the third example of the shape evaluating method. This diagram depicts a pattern shape 80B obtained after the dummy elements DM are removed from the pattern shape 80A of FIG. 8. Here, the line symmetry degree of the pattern shape 80B may be calculated after a first center line 86 different from the X-direction and the Y-direction is set. In the example of the present diagram, an angle formed between the first center line 86 and a Y-axis is (θ1 −45) degrees=(45−θ2) degrees. This line symmetry degree is a matching rate of pixel values obtained in a case where a left side pattern 88L is folded back to a right side pattern 88R (conversely, in a case where the right side pattern 88R is folded back to the left side pattern 88L) with respect to the first center line 86.

In a case where at least the effective elements EF thus have the pattern shape 80B asymmetric as viewed in plan, the line symmetry degree of the pattern shape 80B with respect to the first center line 86 inclined with respect to both the X-direction and the Y-direction may be greater than or equal to 0.8. Because of such a configuration, it is possible to suppress a decrease in accuracy of detection of a position (here, an X-position) indicated by the active pen 104 (FIG. 10), while maintaining the visibility of the pattern shape 80B.

Example of Implementation of Wire Mesh Sensor 100

An example of implementation of the wire mesh sensor 100 including the conductive sheets 12 and 14 (FIG. 1) described above will next be described with reference to FIG. 10.

Figure 10:
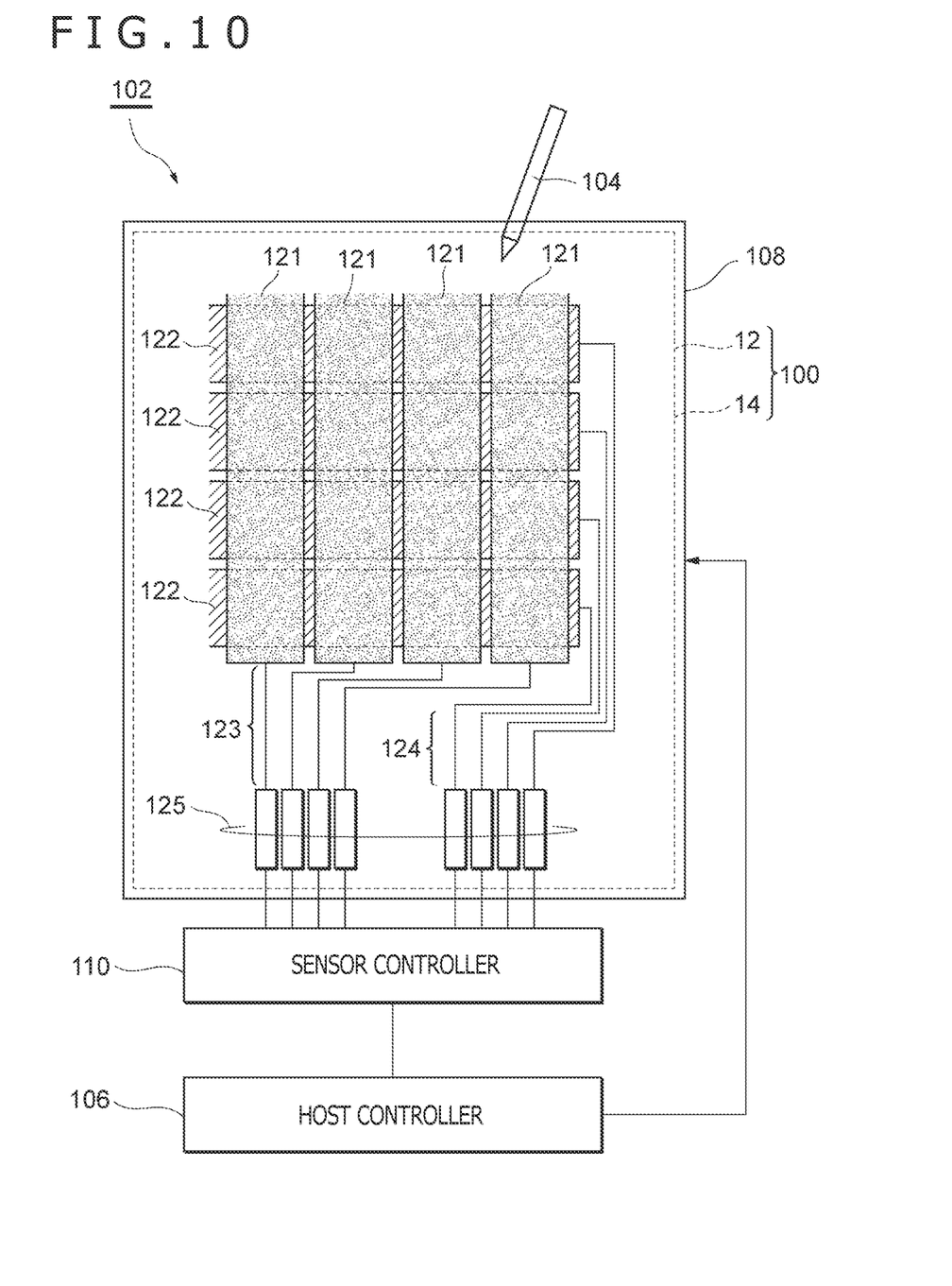
FIG. 10 is a configuration diagram depicting principal parts of an electronic apparatus in which a wire mesh sensor in one embodiment of the present disclosure is incorporated.

FIG. 10 is a configuration diagram depicting principal parts of an electronic apparatus 102 in which the wire mesh sensor 100 in one embodiment of the present disclosure is incorporated. The electronic apparatus 102 is a tablet computer, for example. The electronic apparatus 102 is used in conjunction with a stylus of an active capacitance coupling (active electrostatic (AES)) system (which stylus will hereinafter be referred to as the active pen 104). The electronic apparatus 102 specifically includes a host controller 106, a display panel 108, and a sensor controller 110 in addition to the wire mesh sensor 100 described above.

The wire mesh sensor 100 is a device that is used to be disposed in a state of being superimposed on the display panel 108. The wire mesh sensor 100 is connected to the sensor controller 110. The wire mesh sensor 100 is, for example, formed by the two conductive sheets 12 and 14 being laminated, the conductive sheets 12 and 14 having been inspected through the evaluation processing by the evaluation system 10 depicted in FIG. 1.

One conductive sheet 12 has a wire mesh in a planar shape which wire mesh includes a plurality of band-shaped electrodes 121. The plurality of band-shaped electrodes 121 are each arranged to extend in the Y-direction and at substantially equal intervals along the X-direction. The band-shaped electrodes 121 are respectively connected to the sensor controller 110 via wires 123 different from each other and connection terminals 125.

The other conductive sheet 14 has a wire mesh in a planar shape which wire mesh includes a plurality of band-shaped electrodes 122. The plurality of band-shaped electrodes 121 are each arranged to extend in the X-direction and at substantially equal intervals along the Y-direction. The band-shaped electrodes 122 are respectively connected to the sensor controller 110 via wires 124 different from each other and connection terminals 125.

The host controller 106 is a computer including a processor and a memory (not depicted). The processor reads a program stored in the memory, and executes the program. The host controller 106 thereby performs various kinds of processing such as control of various parts of the electronic apparatus 102 and execution of various kinds of applications including a rendering application. The memory includes a main memory such as a dynamic random access memory (DRAM) and an auxiliary storage device such as a flash memory.

The display panel 108 displays an image or video within an active area by being driven through a driving circuit not depicted. Concrete examples of the display panel 108 include a liquid crystal display, an organic electroluminescent (EL) display, an electronic paper, and the like.

The sensor controller 110 is an integrated circuit (IC) that detects the position of the active pen 104 or a finger (not depicted) of the user at least within the active area of the display panel 108. The sensor controller 110 is functionally configured to be able to detect positions indicated by the active pen 104 and a finger of the user on a touch surface and receive a data signal transmitted by the active pen 104, by reading a program stored in a memory and executing the program by a processor.

The active capacitance coupling system is a system that receives, by the wire mesh sensor 100, a pen signal transmitted by the active pen 104, and detects a position indicated by the active pen 104, based on a result of the reception. The pen signal includes a position signal as an unmodulated burst signal and a data signal representing various kinds of data related to the active pen 104. The various kinds of data include, for example, pen pressure data indicating a pressure applied to a pen tip of the active pen 104. Incidentally, the active pen 104 may transmit the pen signal in response to reception of an uplink signal transmitted by the sensor controller 110 via the plurality of band-shaped electrodes 121 and 122. In this case, the active pen 104 preferably determines concrete contents of the data transmitted by the data signal, according to a command included in the uplink signal.

When detecting the indicated position, the sensor controller 110 receives the position signal by each of the plurality of band-shaped electrodes 121 and 122, and detects the position indicated by the active pen 104, based on a result of the reception. In addition, the sensor controller 110 detects the data signal sent out by the active pen 104, by using an electrode closest to the detected indicated position among the plurality of band-shaped electrodes 121 and 122.

MODIFICATIONS

It is to be noted that the present disclosure is not limited to the foregoing embodiment, and, needless to say, can be modified freely without departing from the spirit of the present disclosure. Alternatively, configurations may freely be combined with each other within a scope where no technical inconsistency arises.

In the foregoing embodiment, description has been made of a pattern shape having a rhombic mesh (FIG. 3 and FIG. 5), a polygonal mesh (FIG. 6 and FIG. 7), or a square mesh (FIG. 8 and FIG. 9). However, the mesh shape is not limited to these. The mesh shape may, for example, be a quadrangle such as a rectangle or a parallelogram, or may be a polygon such as a triangle or a hexagon. In addition, the pattern shape may be a regular pattern, or may be a random pattern.

In the foregoing embodiment, description has been made of the wire mesh sensor 100 in which the two conductive sheets 12 and 14 are laminated. However, the structure of the wire mesh sensor is not limited to this. For example, a configuration in which a first wire mesh is disposed on one principal surface of one substrate and a second wire mesh is disposed on another principal surface of the one substrate may be adopted.

It is to be noted that the embodiment of the present disclosure is not limited to the foregoing embodiment and modifications, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A shape evaluating method for a wire mesh sensor, the wire mesh sensor including one or more wire meshes provided in a planar shape, and the shape evaluating method being performed by one or more computers, the shape evaluating method comprising:
   obtaining, by the one or more computers, image data representing a pattern shape possessed by the one or more wire meshes of the wire mesh sensor;
   calculating, by the one or more computers, using the image data obtained by the obtaining, a line symmetry degree with respect to a center line of the pattern shape possessed by the one or more wire meshes of the wire mesh sensor represented by the image data; and
   evaluating, by the one or more computers, whether the line symmetry degree of the pattern shape with respect to the center line possessed by the one or more wire meshes of the wire mesh sensor represented by the image data calculated by the calculating is within a predetermined range.

2. The shape evaluating method according to claim 1, further comprising:
   outputting a result of the evaluating whether the line symmetry degree of the pattern shape possessed by the one or more wire meshes of the wire mesh sensor represented by the image data is within the predetermined range.

3. The shape evaluating method according to claim 1, further comprising:
   extracting, from the image data, a basic pattern representing a repetition unit.

4. The shape evaluating method according to claim 1, further comprising:
   performing binarization processing that reduces a number of gradations of the image data from three or more to two.

5. The shape evaluating method according to claim 1, further comprising:
   classifying the pattern shape represented by the image data into effective elements and dummy elements; and
   removing the dummy elements from the pattern shape represented by the image data.

* * * * *